June 21, 1955　　G. A. RUGGERI ET AL　　2,711,383

PROCESS FOR BONDING RUBBER TO METAL

Filed June 19, 1951

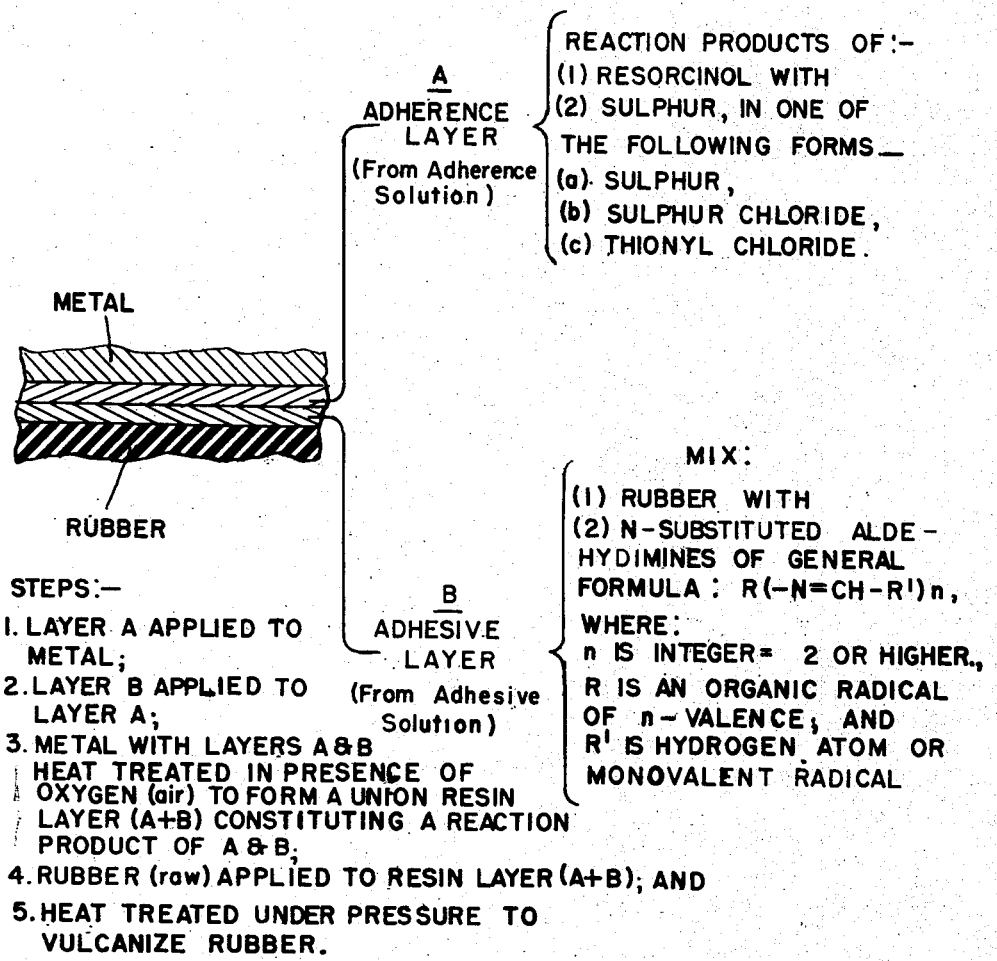

STEPS:—
1. LAYER A APPLIED TO METAL;
2. LAYER B APPLIED TO LAYER A;
3. METAL WITH LAYERS A & B HEAT TREATED IN PRESENCE OF OXYGEN (air) TO FORM A UNION RESIN LAYER (A+B) CONSTITUTING A REACTION PRODUCT OF A & B;
4. RUBBER (raw) APPLIED TO RESIN LAYER (A+B); AND
5. HEAT TREATED UNDER PRESSURE TO VULCANIZE RUBBER.

INVENTORS
GIOVANNI ANTONIO RUGGERI,
& FRANCESCO RUSSO,

BY *Stone, Boyden & Mack*
ATTORNEYS.

United States Patent Office 2,711,383
Patented June 21, 1955

2,711,383
PROCESS FOR BONDING RUBBER TO METAL

Giovanni Antonio Ruggeri and Francesco Russo, Milan, Italy, assignors to Pirelli Societa per Azioni, Milan, Italy Application June 19, 1951, Serial No. 232,456

Claims priority, application Italy July 7, 1950

3 Claims. (Cl. 154—130)

This invention pertains to processes for bonding rubber to metal, and more particularly has reference to such processes, wherein there is such a strong adhesion between natural or synthetic rubbers and metal articles that a single, unitary structure is obtained, and the bond remains unaltered under severe service conditions. Typical examples of such bonds are those between the rubber and metal parts of solid and cushion tires for car wheels; in shock absorbers and vibration insulators of different types; in pneumatic tires, rubber tubes and rubber transmission belts, reinforced with metal cords; and rubber linings for metal tanks, mills, rolls, and the like.

In some of these uses of the application it is required that the bond be adequately resistant at ordinary room temperature only, while in others, adequate resistance at higher temperatures is essential. In some cases, the mechanical stresses that tend to detach the rubber from metal parts may be weak and constant, and in other cases, these stresses are very intensive and vary periodically or irregularly in time. But almost always, one of the most important advantages of rubber in metal-rubber composite structures is its capacitiy to absorb vibrations and deaden blows or shocks.

Heretofore, processes for bonding rubber to metal have usually involved the use of ebonite, cyclized rubbers, chlorinated rubbers, synthetic resins, di- and poly-isocyanates, and some rubbery copolymer. And the best results have been obtained with the well known and widely used process of first electroplating the surface of the metal part with a brass of suitable composition, and then vulcanizing a particular type of rubber compond directly to the brass.

However, processes based on brass-plating are attended with certain marked disadvantages, such as:

(1) The large and expensive apparatus required;
(2) The strongly poisonous properties of the chemicals employed;
(3) The close control of the composition of the electroplated brass layer that is necessary, with the attendant considerable wastage of metal pieces involved;
(4) The impact strength of the bond is relatively low; and
(5) The compositions of suitable rubber compounds are confined within certain narrow limits, which is the most serious drawback of all.

An object of this invention is to provide a process of bonding compounds of natural and/or synthetic rubbers to iron, steel and other industrial metals which does not involve the use of brass-plating.

Another object is to provide such a process wherein the composition of said rubber compounds is not peculiarly limited.

A further object is to provide a process of bonding natural and synthetic rubber compounds to industrial metals, so as to obtain a bond showing a considerable resistance to heat, static actions, periodic stresses and blows.

Still another object is to provide such a process which can be carried out in a safe, simple and inexpensive way, without using substances that are poisonous, irritating, or difficult to prepare.

With these and other objects in view which may be incident to our improvements, our process consists of the following sequential steps:

(1) Applying to a well cleaned (i. e. free from scales and films of oxide, dirt, and other contaminating substances) metal surface, a thin layer of a solution which contains no rubber, but only substances of low molecular weight, including at least one having affinity for metals; and successively drying said solution by evaporation of its solvent. The coating of solution, so applied, will hereinafter be referred to as the "adherence-layer."

(2) Applying to the adherance-layer as in (1) above, a thin layer of another solution, hereinafter called the "adhesive-solution," which is based on natural or synthetic rubbers or a mixture of rubbers (that may be the same as the rubber compound to be bonded, or other rubbers capable of bonding therewith when vulcanized), and contains at least one nitrogenous substituent, capable of reacting with the substance or substances of the adherence-layer, having affinity for the metals and if necessary also with other components of the adherence-layer and of the adhesive solution, so as to form an insoluble, non-melting, metal-adhering resin; and successively drying said adhesive-solution by evaporation of its solvent.

(3) Heat treating, in the presence of air or other oxygen containing gas mixture, the metal parts already solutioned as in (1) and (2) above so as to cause formation of said resin, by the reaction of the proper components of said solutions contacting the metal, and subsequent successive air-cooling the treated parts.

(4) Applying the vulcanizable rubber compound which is to be bonded to the metal parts already solutioned and heat treated as in (1), (2) and (3) above by a press or transfer molding, or other suitable process.

(5) Vulcanizing heat treatment under pressure of the composite article, formed by the metal parts, solutioned and heat-treated as in (1), (2) and (3) above, and the rubber compound applied as in (4) above. This fifth step is normally carried out concurrently with step (4) above, and with the same apparatus, as is usual in prior art bonding processes. The general assembly of elements is shown by the figure of the drawing.

During the first heat treatment (step 3 above) some of the components of both solutions migrate and react upon each other to form a resinous layer which is rather flexible but not thermoplastic, and which bonds to the metal and to the rubber film originated from the adhesive solution; thus bonding the rubber film to the metal. Since the adhesive solution does not include the proper ingredients required for its vulcanization, or includes only a part of them, the rubber film which is bonded to the metal, in consequence of the first heat-treatment, does not vulcanize and therefore its adhesive properties remain unaltered. However, upon applying to this rubber film the vulcanizable rubber compound to be bonded, they adhere together even when uncured.

During the vulcanizing heat-treatment under pressure of the composite article (step 5 above) the ingredients required for vulcanizing said rubber film, which is lacking in them, firstly migrate into it, from the already adhered rubber compound, and the vulcanization and bonding of said rubber film and of said rubber compound then occur, thus forming a single piece.

The metal parts to be bonded to the rubber compound are prepared before the application of the adherence-layer (step 1 above) according to the usual methods adopted for most of the processes heretofore known. Satisfactory results are obtained, for example, by sandblasting, or by treating the metal in acid baths and then washing and drying completely.

The ingredients of the adherence-layer, which, owing to their affinity for metals and to their capacity of forming resins by reaction with other ingredients of both solutions, give the bond, according to the present invention, may belong to different classes of chemical organic compounds.

Particularly good results are obtained by employing substances of low molecular weight having an affinity for metals, such as phenols, or thiophenols, containing in their molecules more than one substituent, and in the whole, at least two labile hydrogen atoms; the substituents being formed by oxygen, sulphur, halogens, or nitrogen atoms, as single or linked to one another, and eventually with hydrogen or carbon atoms. Besides the phenolic hydroxyl group —OH and the thiophenolic sulphydril group —SH, which are present in the so-defined substances, the substituents may be, for example, chlorine atoms, bromine atoms, or atomic groups, such as: sulphide —S—, disulphide —SS—, polysulphide —Sn, sulphoxide —SO—, sulphone —SO$_2$—, sulphonium halide $\equiv$SA (where A indicates an atom of halogen), sulphonium hydroxide $=$S—OH, oxide —O—, primary amino—NH$_2$, secondary amino—NHR (where R is an aryl radical), nitro —NO$_2$, or thiocyan —SCN. The labile hydrogen atoms of said phenols and thiophenols, to which the formation of the resin is due by reaction with the proper ingredients of the same and of the other solution, are those belonging to the sylphydril and hydroxyl groups, from which the transfer to the aromatic nucleus, or nuclei, occurs at the free positions (ortho and para) to which ultimately the number of the labile hydrogen atoms corresponds.

Besides having the active atoms and atomic groups above-mentioned, such substances may contain other substituents, which are not efficient for the purpose of the present invention, as for instance, alkyl, cyclo-alkyl, aryl and aralkyl groups.

The following are further examples of substances, suitable for this invention, which have a particular affinity for metals and form resins when reacting with the other components of the two solutions, as hereinafter indicated: resorcinol, 2-methylresorcinol, catechol, pyrogallol, phloroglucinol, 1,3-dimercaptobenzene, mercapto-resorcinols, mercaptohydroquinones, p-bromophenol, 4-chlororesorcinol, 2,5-dibromohydroquinone, p-nitrophenol, ethereal anhydroresorcinols, diresorcinolsulphides, diresorcinoldisulphides, resorcinolpolysulphides, diresorcinolsulphoxides, p,p'-dihydroxydiphenylsulphone; chlorides and hydroxydes of resorcinolsulphonium, p-aminophenol, p-hydroxydiphenylamine; and the analogous derivatives of naphthalene, pure or blended or eventually in form of technical products, or of raw or refined reaction products. The reaction products of resorcinol, or of the other phenols, with sulphur, with the sulphur chlorides, and with thionyl chloride are to be particularly remarked.

Besides the above mentioned products, those phenolic compounds may be part of the adherence-layer, which have less affinity for the metals, and, when alone, do not react to form resins, or react only sluggishly with the proper ingredients of both solutions, but on the contrary, form resins with the said components when mixed with the phenolic compounds already indicated, provided they are present in an amount such as not exceeding the weight ratio of 1:1. These phenolic substances, which will be called "semiactive," in order to distinguish them from the above mentioned, which will be called "active," are those containing in their molecules only one phenolic hydroxyl, not connected with any other active substituents, and having however in their molecules two or three labile hydrogen atoms. Examples of semiactive phenolic substances are phenol itself and parametacresol (commercial blend of para- and meta-cresols).

As antioxidants for the adherence-layer upon its application (that is, before the heat-treatment), other phenolic substances may be added in case this layer contains some products liable to be oxidated in presence of air, though, also in this case, the addition of an antioxidant is not generally required. For this purpose, active and semiactive phenolic substances of different type, as, for instances, hydroquinone, beta-napththol, monobenzyl-ether of hydroquinone and 2,6-tert. butyl-4-methylphenol, may be employed.

Nitrogenous substances, capable of forming resins when reacting with the above mentioned substances, and belonging to the series of condensation products of ammonia and primary amines with aliphatic, aromatic, and heterocyclic aldehydes, are usually contained in the adherence-layer, even if they are not necessary for the bonding, which however is substantially improved by them. These basic substances serve also to bring back toward neutrality the pH of the adherence-layer, which might be otherwise more or less strongly acid, thus avoiding any possibility of metal corrosion by part of the adherence-layer, when applied and before the first heat-treatment (step 3 above).

The following are examples of these condensation products: hexamethylenetetramine, aldehyde ammonia, furfuramide, trimer methylenethylamine, and benzalethylamine.

The adherence-layer is made by dissolving said components in a common solvent, or in a blend of solvents, or by dissolving every component in a particular solvent and mixing the thus obtained solutions. Said solvents may be alcohols, as methyl or ethyl alcohol, ketones, as acetone, methylethylketone, halogenated hydrocarbons, as methylene chloride, chloroform, and the like. Water is also employed as a solvent, together with other solvents, it being always a minor component of the total mixture.

In order to more easily evaluate the uniformity and the thickness of the adherence-layer during its application, said layer may be colored by incorporating mineral or organic pigments in it, and preferably by adding to it solvent soluble dyes, such as methyl violet, ethyl green, and the like.

The total ratio by weight between the nitrogenous components and the active, or semiactive phenolic or thiophenolic substances, may vary within a very wide range; from less than 1:10 to 1:1, and preferably within 1:5 and 1:2. The phenolic components to be used as antioxidants are generally not more than 5% on the total weight of said components; the pigments and the dyeing substances do not exceed, as a rule, respectively 5% and 1% on the total weight of the dissolved substances.

The adherence-layer may be applied by brushing, spraying, dipping, by means of rollers or cylinders, or by any other means capable of forming on the metal a thin continuous layer of uniform thickness.

According to its composition, the total dry content of the adherence-layer may vary from 15% to 20% or a little more, when it is applied by means of a paint-brush, and from about 6 to 10% when sprayed. The adhesive solution may be applied just after the solvents of the adherence-layer have evaporated.

The peculiar components of the adhesive solution, besides the rubbers, that is the ingredients which, when reacting with the peculiar components of the adherence-layer, form the resin to which the bond to the metal, as well as the bond between the two layers, is due, must be selected according to the composition of the adherence-layer. By using an adherence-layer compounded as above indicated, good results are obtained for the purposes of this invention, by the employment of adhesive solutions containing N-substituted aldehydimines, which contain in their molecules two or more azomethynic groups —N=CH—, and which can be indicated by the general formula R(—N=CH—R')$_n$; where $n$ is an integer number, equal to or higher than 2, R is an organic radical of the $n$-valence and R' is one atom of hydrogen, or a monovalent radical; the $n$R' groups being either equal or different. The said aldehydimines may be employed as single or mixed, or mixed also with N-substituted aldehydimines having in their molecules only one azomethynic group, and eventually with active or semiactive phenolic and/or thiophenolic substances, as defined in the description of the adherence-layer.

The N-substituted aldehydimines indicated by the above general formula have the chemical characteristic of being double and multiple Schiff's bases and will be called hereafter respectively dialdehydimines and polyaldehydimines and generically aldehydimines, the name of monoaldehydimine being given to the simple Schiff's bases, in which only monovalent radicals are linked to a single azomethynic group.

R and R' (in case R' is not an hydrogen atom), may be alkyl, cycloalkyl, aralkyl, or aryl groups (containing one or more simple or condensed nuclei), into which halogen atoms may also be substituted, or elements of the oxygen subgroup may be inserted. At least one of the R's is however preferably an olefinic radical, having a small number of carbon atoms, or a furyl, or another radical containing one furanic nucleus; and R is preferably a bivalent radical, constituted by polymethylenic chains comprising at least four terms, among which oxygen and sulphur atoms may also be inserted.

The di- and poly-aldehydimine may be easily obtained by condensing (water being formed) primary diamines and polyamines with aldehydes, and precisely with those containing in their molecules only one aldehydic group, in the ratio of one aldehydic molecule for each primary amino group. In order to prepare the mixed aldehydimines, that is, those containing R' groups differing among them, two or more different aldehydes may be reacted with the same diamine or polyamine.

In preparing the di- and polyaldehydimines, the following amino substances may be, for instance, employed: tetramethylenediamine, hexamethylenediamine, di-beta-aminoethyl ether, di-beta-aminoethyl sulphide, p-phenylenediamine, m-toluylenediamine, 1-chloro-2,4-diaminobenzene, benzidine, p,p'-diaminodiphenylmethane, the naphthylenediamines, 1,3,5 triaminobenzene and p,p',p''-triaminotriphenylmethane. In preparing the monoaldehydimines, the following substances may be used: 2-ethylhexylamine and aniline. As aldehydic substances, the following may be employed: formaldehyde, acetaldehyde, acrolein, crotonaldehyde, benzaldehyde, furfural and furylacrolein.

As examples of the aldehydimines that can be employed for the purposes of the present invention, are the following: methylene-furfurylidene-hexamethylenediamine, di-furfurylidene-hexamethylenediamine, di-furfurylidene-di-beta-aminoethyl sulphide, dimethylene-p-phenylenediamine, di-allylidene-p-phenylenediamine, difurfurylidene-p-phenylenediamine and tri-furfurylidene-p,p',p''-triamino-triphenylmethane.

Some Schiff's bases may polymerize, just after being formed, giving the respective dimers and trimers. These low polymers may also be employed for the purposes of this invention, but monomeraldehydimines, being more reactive, are preferred.

The amount of aldehydimine, or the total amount of the aldehydimines, to be incorporated in the adhesive solution, may vary within a very wide range, as for example from 8 to 100% by weight of the rubber, and preferably from 30 to 80%. The total amounts of the phenolic, and/or thiophenolic substances, when present, are not as a rule higher than 20%, and generally not over 12% by weight of the rubber.

Besides the aldehydimines and the possible phenolic and thiophenolic substances required for obtaining the bond, which will be hereafter named "bonding ingredients," the adhesive solution may, and sometimes must, contain some of the usual rubber ingredients, which must of course be adequate to the nature of the rubber or rubbers present in the solution.

In case of natural rubber, and of synthetic rubbers formed of polymers or copolymers of butadiene and its homologues, the solution may contain zinc oxide and accelerators, but normally must not contain sulphur or other vulcanizers; though, by using some of the aforementioned aldehydimines, a considerable amount of sulphur may be added to the adhesive solution without affecting the bond.

Carbon black, or another reinforcing filler, or a blend of fillers, must be present in the adhesive solutions containing the aforesaid synthetic rubbers, to impart to the rubber films being formed by them the best mechanical properties.

The presence in the adhesive solution of antioxidants, especially of the aromatic secondary amines type (as for instance, phenyl-beta-naphthylamine, N,N' diphenyl-p-phenylenediamine, and p,p'-dimethoxydiphenylamine), in an amount up to 3% by weight of the rubber, is advisable if the heat treatment, during which the resinification occurs, lasts a long time at a high temperature, because the antioxidant helps to avoid an extreme oxidation of the rubber. When the resinification of the bonding ingredients has to take place at a lower temperature, the addition of antioxidants to the adhesive solution is not required.

When employing adhesive solutions based on synthetic rubbers which already contain some antioxidants, but nevertheless have the tendency to harden and form resins, when subjectel to a high temperature heat treatment in air, so that the desired plasticity and adhesion fail, to avoid this inconvenience it is often advisable to add to the adhesive solution a peptizing agent, such as beta-naphthyl-mercaptan, xylil-mercaptan, trichlorothiophenol, o,o'-dibenzamide-diphenyldisulphide, in amounts up to and over 1% by weight of the rubber.

Rubber may be partially or entirely substituted, in the already described adhesive solutions, by reclaimed rubber.

The adhesive solutions required for bonding the synthetic rubber compounds, based on polymers or copolymers of the chlorobutadienes, and vulcanizing by means of zinc oxide, are to be made of the same synthetic rubber, together with the usual adhesive ingredients and they must not contain zinc oxide. Magnesium oxide, which acts as an accelerator for this type of rubbers, may be added, although this addition is not strictly required.

The adhesive solution may be prepared by mixing in the rubber, or rubbers, the bonding agents as well as the other ingredients, if necessarily occurring, and by dissolving the so-obtained rubber stock in a solvent, or in a blend of solvents, for the rubber or rubbers.

Some of the ingredients, including all the insoluble ones, such as zinc oxide, and the blacks, when present, may also be incorporated in the rubbers, or in a fraction of them, and the so obtained stock dissolved, jointly with or separately from, the other eventually required rubbers, previously milled if necessary, and the ingredients not already present in the stock, in a single rubber solvent or blend of solvents, or in different solvents, including special solvents for the nonincorporated ingredients, the separate solutions being in the last case accurately mixed.

In many cases, the different types of gasoline, well known in the rubber industry, can be employed as solvents, but the aromatic hydrocarbons and especially more volatile ones (as benzene, toluene, xylene), and sometimes also chloroform, are preferred, because they generally dissolve also the aldehydimines. If necessary, special solvents as methylethylketone and butyl acetate or their blends, with some other solvents, may be employed for synthetic rubbers. In case phenolic or thiophenolic substances are to be added in solution, acetone may be employed as a solvent for them, in such a quantity not to cause the rubber or rubbers to precipitate; the presence of rubber being generally sufficient to keep in dispersion all ingredients. The use of alcohols must be avoided.

The solvents or the blends of solvents mentioned above have the advantage of not dissolving considerably the most important of the ingredients of the adherence-layer; the inconvenience of displacing them while applying the adhesive solution being thus avoided.

The adhesive solution may be applied according to any process mentioned in describing the application of the adherence-layer. According to the composition of the adhesive solution, its total dry solid content may vary from 6 to 17% when it is applied by means of a paint-brush, and from approximately 3 to 6% when it is applied by spraying.

For a same application, the amounts of solids deposited on a given surface, from the adherence-layer and the adhesive solution, may vary within a considerably wide range. Nevertheless they are not quite independent, but must be proportional. Their ratio may vary according to the respective compositions; for the most usual compositions, said ratio ranging from 1:3 to 1:7.

The solutioned metal parts can be heat-treated as soon as the solvents of the adhesive solution are evaporated, that is, about half an hour after the application of the solution; or also a shorter time after, especially if the film formed by the said solution is very thin. If necessary, the solutioned metal parts may also be heat-treated some hours after the adhesive solution has been applied.

The heat treatment may be carried out under super-atmospheric pressure, although normal atmospheric pressure is preferred, in an oven, preheated at the desired temperature and containing air, or air enriched with oxygen, or ozonized air, or a mixture of gases containing not less than 20% by volume of oxygen and so compounded that its other components do not exert any chemical action either on the metal or on the components of the layers formed from the adherence-layer and the adhesive solution. The said treatment can also be carried out under reduced pressure, but this is not of any practical utility.

In the oven the air, or the other oxygen-containing gaseous mixture, must have a relative humidity (measured at room temperature) not higher than 80% and preferably about 50%.

Temperature and time of the heat-treatment may vary according to the compositions of the adherence-layer and the adhesive solution. For given compositions, the time is dependent on the temperature; that is, the same result may be obtained by a short heat-treatment at a high temperature, or by a longer heat-treatment at a lower temperature. For a given temperature, the time may however vary within a considerably wide range. The limits within which the heat-treatment time may vary, at a given temperature, increase as the temperature is lowered.

For adherence-layers and adhesive solutions compounded with the above mentioned bonding ingredients, the temperature may vary from less than 110° C. to over 170° C., and at 140° C. a two hours' treatment is generally sufficient.

The resinification time for a given temperature being known, the time required for a different temperature may be approximately calculated, within acceptable limits, by doubling it or by dividing it by two, for every decrease or increase of about 8° C. in temperature. It is preferred that, during the heat-treatment, the air or the other oxygen-containing gaseous mixture be circulated inside the oven, thus facilitating the raising in temperature of the solutioned metal parts, and providing a more uniform distribution of the temperatures inside the oven.

Time and temperature of the vulcanizing heat-treatment of the assembly, composed of the metal parts treated as above described, on which the vulcanizable rubber compound has been applied, must be such as to assure a good vulcanization of the rubber compound. The same heat-treatment will equally assure a good vulcanization of the rubber film deposited from the adhesive solution; this rubber vulcanizing entirely or partially by virtue of the ingredients migrated into it from the body of the rubber compound at the beginning of the heat-treatment, and its thickness being so little, that the time required for said migration is practically negligible. Vulcanization times of 20 minutes at 143° C. or of 1 hour at 127° C. and also shorter times at higher temperatures, are generally sufficient.

As already mentioned, one of the greatest advantages of our novel bonding process, compared with those involving brass-plating and others already known, is the fact that there are practically almost no limits to the composition of the vulcanizable rubber compound to be bonded. Said rubber compound may contain any accelerator and any activating agent for said accelerators, as for instance stearic acid (also in a high percentage: 3% or more by weight of the rubber), antioxidants of any type and plasticizers even in large amounts, and reclaimed rubber of any kind. Sulphur curing rubber compounds and rubber compounds curing with other sulphurated vulcanizing agents, such as tetramethylthiouram disulphide, in proper amounts, give equally good results, said compounds being based either on natural rubber, or on synthetic rubbers consisting of polymers or copolymers of butadiene or its homologues.

Rubber compounds, showing (after vulcanization) hardnesses ranging from 32 to 75 Shore A and over, bond likewise satisfactorily. The softer rubber compounds, deforming under load to a greater extent, are subjected under load to such a concentration of stresses that they break off as a rule under total loads which are less than those recorded for the harder rubber compounds, wherein the rubber rupture occurs more easily. This inconvenience may be avoided by applying to the solutioned heat-treated metal parts one or more layers of a solution, or a thin calendered sheet of a harder rubber compound having the same vulcanization time as the soft rubber compounds to be bonded, and containing the same accelerators and vulcanizing ingredients; and thereafter assembling to the metal parts the rubber compound to be bonded and vulcanizing the composite article.

One of the advantages of the process of this invention is that a single adherence-layer permits satisfactory bonds, to be obtained with industrial metals and metal alloys, having very different chemical and physical characteristics, such as: ingot iron, carbon steel, stainless steel (containing 18% of nickel and 8% of chrome), copper, aluminum, zinc, lead, tin, brass, bronze and even nickel and chrome. More exactly, our improved bonding process is applicable to all the metals which form water-insoluble hydroxides, but it is not applicable to the alkali and alkaline earth metals (e. g. sodium and calcium), which can not be used in the manufacture of rubber-to-metal bonded articles.

On the other hand, by using different adherence-layers in connection with special metals, or groups of metals, more satisfactory results may be obtained.

By using a given adherence-layer together with a single adhesive solution based on natural rubber, satisfactory bonds may be obtained either with the vulcanizable natural rubber compounds or with those based on synthetic rubbers comprising copolymers of butadiene and styrene (Buna S, GR–S) alone, or in mixture with natural rubber, or with those based on thioplasts (Thiokol A, Thiokol D, Thiokol F), especially if these latter contain even small amounts of natural rubber. Satisfactory bonds are also obtained with the said styrene-containing synthetic rubbers, by using adhesive solutions based on the same synthetic rubbers. This latter method must necessarily be used to bond the other synthetic rubber consisting of copolymers of butadiene and acrylonitrile (Perbunan, Hycar OR, Polyjar N), or of polymers or copolymers of the chlorobutadienes (Neoprene GN, Neoprene GN-A), or of copolymers of isobutylene and small amounts of butadiene or isoprene (butyl rubbers).

The resistance of the bond to the swelling action of the solvents and plasticizers is generally similar to, or greater than, that shown by the vulcanized rubber compounds assembled to the metals, provided that the adhesive solution has been prepared with the same rubber, or mixture of rubbers, present in the compound; the resin formed by the adhesive ingredients being, per se, insoluble in the various solvents or plasticizers.

The heat-resistance of the bond is very satisfactory. In the mechanical tests carried out at temperature above the room temperature, for instance at 100° C., the rupture generally occurs in the rubber instead of in the bond between the rubber and the metal parts; the mechanical resistance of the rubber decreasing more rapidly than that of the bond itself. The same result is obtained when the tests are carried out with oven-aged specimens.

Another very remarkable advantage of this process is that the bond shows a very high resistance to fatigue and impact tests. A good resistance is observed also when operating fatigue tests at 100° or 120° C.; the bond itself being highly heat resistant, as already stated.

In order to demonstrate the improvement of our novel rubber-to-metal bonding process, we devised special laboratory tests which are hereafter described for quantitatively evaluating the mechanical resistance of the bonds resulting from our process, in comparison with bonds produced by prior art processes. The results of the tests are shown in connection with various examples of rubber-to-metal bonds resulting from our novel process.

Practical tests carried out on various types of shock absorbers, elastic wheels, rubber-band tired wheels, rubber lined cylinders and so on are in accordance with the excellent results obtained in the laboratory tests.

TEST METHODS

*Preparation of the test specimens.*—Two kinds of specimens, which will respectively be called hereinafter "of the first type" and "of the second type" were employed in the various tests.

The specimens of the first type are similar to the ASTM specimens (ASTM Standards, 1946, Part IIIB—Nonmetallic Materials—Standard Method of Test for "Adhesion of Vulcanized Rubber to Metal"—D429–39) but of smaller size, and in addition, the rubber part is not shaped as a cylinder but as a torus of rectangular cross-section, that is, as a ring defined by two coaxial cylindrical surfaces, respectively 22 mm. and 10 mm. in diameter, and by two plane surfaces, perpendicular to the axis of the cylindrical surfaces, and 2 mm. apart from each other. The two annular bases of said rubber ring are bonded each to the one face of two metal pieces, similarly shaped as cylindrical rings, 10 mm. in height and having diameters equal to those of the rubber ring. The bond surfaces of the metal parts are flat and smooth and are parallel and coaxial in the finished specimen. Each metal piece has a groove on its outer cylindrical surface and is threaded on its inner cylindrical surface so as to allow it to be clamped to the testing machine. The finished specimen is obtained by inserting a crude rubber compound ring, shaped as it will be after vulcanization but slightly thicker, between the two metal pieces, and vulcanizing the assembly into a sectional mold of proper construction in an hydraulic steam-heated press. The specified diameters provide a cross-sectional area of about 3 cm. square.

The specimens of the second type have the rubber part in ring form, defined by two cylindrical, circular, coaxial surfaces, respectively 48 and 40 mm. in diameter and 4 and 5.8 mm. in height, and by two conical surfaces, coaxial with the above cylindrical surfaces and symmetrical with respect to the centre of the specimen. The cylindrical surfaces of this ring are respectively bonded over their whole exteriors to an external 4 mm. thick metal ring and to an internal 5.8 mm. thick metal ring, which are shaped so as to allow them to be clamped to the testing machine. The diameters and the highnesses of the cylindrical surfaces are proportioned so as to have in the rubber part of the specimen under test a shear load which is equal in the internal and in the external cylindrical layers bonded to the metal parts. The cylindrical metal surfaces to be bonded are smooth. The specimen is molded into a suitable transfer mold, in an hydraulic steam-heated press.

*Static tensile test.*—The specimens of the first type are subjected to tensile stress by means of a dynamometer, having a loading capacity of 250 kg. and fitted with a load-recording device; the dynamometer being operated during the test so that the moving clamp of the machine travels at a speed of about 25 mm. per minute. The load of 250 kg. is not, however, always sufficient to cause the detachment or the rupture of the specimens obtained according to the process of this invention.

As stated for the A. S. T. M. test, the values of the load required for the detachment or rupture of the rubber are read and referred by calculation to the cross-sectional area of the specimen, or eventually note is taken that the specimen has not been broken.

*Static shear test.*—For this test specimens of the first type are employed. The metal parts of the specimen being clamped to the heads of a torsion-dynamometer, one of them is rotated with respect to the other around the axis of symmetry of the specimen, without displacing the latter along the said axis, until the detachment or the rupture of the rubber occurs. From the reading of the scale in the machine, the maximum shear load, at the periphery of the specimens and causing the detachment or the rupture of the rubber, is calculated. The dynamometer is enclosed in a case whose inside may be electrically heated, so that the test may be carried out also at temperatures higher than room temperature.

*Dynamic shear tests.*—These are two fatigue tests operated by means of proper machines, acting respectively on the specimens of the two types and are carried out by subjecting the specimens to alternative torsional stresses having intensities lower than those required for causing the immediate detachment or rupture of the rubber parts.

The test employing the specimens of the first type and which will be hereafter indicated with the letter "A," is advisable only for rubber compounds having Shore A hardnesses of about 60–70.

In this test, the one of the metal parts of the specimen is rotated with respect to the other around the axis of symmetry of the specimen for an angle of 24° alternatively to the one direction and to the opposite one, under the action of a couple nearly constant (kg.cm. 17.2) and at a frequency of 320 cycles per minute. This test is effected at room temperature only.

The number of cycles required to cause the detachment of the rubber from the metal parts or the rupture of the rubber in a rather wide sector is reported.

The dynamic shear test employing specimens of the second type hereafter indicated with the letter "B," is operated by rotating one of the metal parts with respect to the other, around the axis of symmetry of the specimen, alternatively in opposite directions, for equal angles in both senses, at a frequency of 360 cycles per minute. The torsion angle is selected according to the hardness or, more exactly, to the shear modulus of the vulcanized rubber compound employed for the test, so as to obtain a maximum shear load about the same for the different rubber compounds. The testing machine is enclosed in a case, whose inside may be electrically heated, so that the test may be effected also at temperatures higher than room temperature, up to 120° C. The number of cycles required to cause the detachment of the rubber from the metal parts or the rupture of the rubber in a rather wide sector is reported.

*Impact test.*—For this test specimens of the first type are employed. The specimen being arranged with its symmetry axis in a vertical position, its upper metal part is clamped to a support fixed at sufficient height and its lower metal part is attached to the one end of a metal chain supporting a weight at the other end. Raising the weight at the level of the specimen and allowing it to fall freely, an axial stress is caused. The impact value is calculated by multiplying the fall height (m. 1.50) by the weight (kg. 3). The number of blows required to cause the detachment of the rubber from the metal parts or the rupture of the rubber is reported.

Having now described all steps of the process of the present invention and the various methods for its practical execution, the results obtained therefrom are illustrated by the following examples, without the field of the invention being thus limited; it being on the contrary extended to all modified embodiments above indicated. When not otherwise specified, the values reported in the examples indicate parts by weight.

EXAMPLES

*1st example.*—This example refers to the results obtained by subjecting to the static tensile test a number of specimens manufactured with adherence-layers containing components having affinity for the metals, some sulphurated phenolic compounds, and adhesive solutions containing an aldehydimine derived from an aromatic diamine, prepared by one of the following methods.

Mixtures of isomeric monosulphides or disulphides of resorcinol are prepared by reacting in dehydrated ethyl ether respectively sulphur bichloride $SCl_2$ or sulphur monochloride $S_2Cl_2$, and resorcinol in the molecular ratio of 1:2, and then eliminating the solvent as well as the hydrogen chloride formed in the reaction. Reducing the thus obtained diresorcinol disulphides by means of granulated metallic zinc and diluted sulphuric acid, and extracting the aqueous solution by means of ethyl ether, a mixture of isomeric mercaptoresorcinols is obtained.

According to an easier and more economical method, reacting resorcinol and sulphur in the ratio of one gram-molecule of the former to one gram-atom of the latter at a temperature of 220–225° C. for about two hours, a mixture is obtained, which is composed essentially of mercaptoresorcinols and diresorcinol monosulphides and contains also unaltered resorcinol, diresorcinol disulphides, dimercaptoresorcinols and resinous resorcinol polysulphides. In this reaction hydrogen sulphide is formed. The raw product resulting from the reaction carried out in the presence of 1% of hydroquinone on the total weight of reactants will be hereafter indicated with the letters "RZ."

Mixtures richer in resinous resorcinolpolysulphides can be obtained by reacting resorcinol with larger amounts of sulphur or of sulphur chlorides, up to the stoichiometric ratio of 1:1.

Other phenolic substances, such as phenol, hydroquinone, and the like, can be reacted with the sulphur chlorides or with sulphur. In order to obtain the reaction of sulphur with phenol a temperature at about 300° C. and pressure are applied. The reaction products of hydroquinone with sulphur, obtained by melting the reactants at a temperature of about 250° C. are practically insoluble in the organic solvents but they can be transformed in soluble mercaptanic derivatives, by heating them with an aqueous solution of sodium sulphide, which dissolves them, and acidulating the liquid. Of the soluble sulphurated phenolic substances thus formed, a part will separate and is collected, washed and dried; the balance remaining in solution is extracted with ethyl ether and recovered from the solvent.

The raw or refined products of the above indicated reactions, as well as the pure compounds which can be isolated therefrom (phenolic mercaptans, monosulphides, disulphides), can equally be employed to prepare the adherence-layers. For this purpose, to the sulphurated phenolic derivative, dissolved in 95° pure or denaturated ethyl alcohol, a 40% aqueous solution of hexamethylenetetramine is added and the obtained solution is then diluted with ethyl alcohol, so as to have a weight rate of 5:2 between the two dissolved substances, with a total solids content of 20%. The adherence-layer obtained, as above, by mixing the solutions of the RZ product and hexamethylenetetramine, with the addition of 3% of hydroquinone on the total weight of both components, will be hereafter indicated with the letters "ERZ." The letters "EIRZ" will instead indicate the adherence-layer obtained by employing, in absence of hydroquinone, with hexamethylenetetramine, the raw product obtained reacting at 220–225° C. 32 parts by weight of sulfur, 99 of resorcinol and 11 of hydroquinone. The adherence-layer EIRZ is then coloured by adding to it 0.5% of methyl violet on the total solids content.

The monomer difurfurylidene-p-phenylenediamine is prepared by reacting p-phenylenediamine, dissolved or suspended in ethyl alcohol, with furfural in the molecular ratio of 1:2 and collecting, washing and drying the product of the reaction. The so obtained raw product will be hereafter indicated with the letters "PF."

Several rubber stocks are prepared, having the following compositions:

| Recipe | "a" | "b" | "c" | "d" | "e" | "f" |
|---|---|---|---|---|---|---|
| Rubber (Smoked Sheets) | 100 | 100 | 100 | 100 | 100 | 100 |
| Zinc oxide | 5 | 5 | 5 | 5 | 5 | 5 |
| Mercaptobenzothiazole | 1 | 1 | 1 | 1 | 1 | 1 |
| Phenylbetanaphthylamine | 2 | 1 | 1 | 1 | 3 | 1 |
| Channel Black | 25 | | | | | |
| PF | 10.8 | 14.4 | 21.6 | 21.6 | 24.3 | 32.4 |
| Resorcinol | 6 | 12 | | 12 | 9 | 12 |

The corresponding adhesive solutions are prepared by dissolving these rubber stocks in benzene, in the weight ratio of 1:5.

In order to prepare the test specimens, an adherence-layer having any of the compositions above indicated is lightly brushed on the bond surfaces of the iron parts of specimens of the first type, to obtain a thin film. Two hours later, an adhesive solution having any of the compositions above described is lightly brushed on the first deposited layer, to obtain another thin film over it.

About one hour after, the iron pieces are placed in an oven, preheated at 160° C. and maintained at this temperature for two hours.

In order to complete the specimens, pieces of a rubber compound of the following composition which will be named hereafter "A50," cut in the stated shape, are assembled to the above treated iron pieces:

Rubber (smoked sheets) _____ 100
Zinc oxide _____ 10
Benzothiazilcyclohexylsulphenamide _____ 0.5
Phenylbetanapthylamine _____ 0.8
Phenylalphanaphthylamine _____ 0.2
Stearic acid _____ 4
Channel black _____ 25
Sulphur _____ 2.5

Because of its content of stearic acid, and of the kind of accelerator, this rubber compound is not suitable to be attached to brass-plated iron. The optimum tensile properties are obtained by curing this rubber compound for 30 minutes at 143° C. Thus cured, the A50 compound shows the following mechanical characteristics (Schopper's rings):

Shore A hardness _____ 50
Modulus, 300%, kg./cm.$^2$ _____ 70
Tensile strength, kg./cm.$^2$ _____ 280
Ultimate elongation, percent _____ 600

The rubber-to-metal bonded specimens vulcanized in this manner and subjected to the tensile test, break under different loads according to the compositions of the adherence-layers and the adhesive solutions. When adherence-layers based on pure mercaptoresorcinols, diresorcinal disulphides, and the like, are employed, the breaking loads vary from 63 to 83 kg./cm.$^2$; and when the adherence-layers ERZ and ELRZ are employed, the breaking load is, as a rule, not inferior to 80 kg./cm.$^2$ and often higher than 83 kg./cm.$^2$.

The rupture normally occurs in the film formed by the adhesive solution.

*Example 2.*—This example shows the results of different tests effected by using an adhesive solution containing, besides the ingredients whose use has been indicated in the 1st example, an aldehydimine derived from an aliphatic diamine.

The monomer difurfurylidenehexamethylenediamine is prepared by reacting the hexamethylenediamine with furfural in the molecular ratio 1:2, at a temperature not exceeding 50° C., and drying the resulting product, so as to eliminate the water formed in the reaction. The raw product of this reaction will be hereafter indicated with the letters "EF."

Three rubber stocks respectively indicated hereafter by the letters "A," "B" and "C," are then separately prepared, having respectively the following compositions:

|  | A | B | C |
|---|---|---|---|
| Rubber (Smoked sheets) | 50 | 25 | 25 |
| Zinc oxide | 5 | | |
| Mercaptobenzothiazole | 1 | | |
| Phenyl-beta-naphthylamine | 3 | | |
| Resorcinol | 9 | | |
| PF | | 16.2 | |
| EF | | | 16.7 |
| Totals | 68 | 41.2 | 41.7 |

The adhesive solution is prepared by dissolving together 68 parts of the rubber stock A, 41.2 of the rubber stock B and 41.7 of the rubber stock C, in 750 parts of benzene, thus obtaining a weight ratio of about 1:5 of the total of the three rubber stocks as compared with the solvent.

On the bonding surfaces of 30 iron parts for the manufacture of specimens of the first type the adherence-layer ERZ, described in the 1st example is lightly brushed and, an hour after, a thin film of the adhesive solution above described is brushed over it. Half an hour after this second application, the metal parts are placed in an oven fitted with an air-circulating device and preheated at 140° C., where they are maintained for two hours at the said temperature. The so-treated metal pieces are assembled with a rubber compound having the following composition, which will be hereafter indicated with the letters "M70":

| | |
|---|---|
| Rubber (smoked sheets) | 100 |
| Zinc oxide | 10 |
| Mercaptobenzothiazole | 0.75 |
| Phenylbetanaphthylamine | 0.80 |
| Phenylalphanaphthylamine | 0.20 |
| Stearic acid | 1 |
| (High modulus furnace) black | 80 |
| Sulphur | 3 |

The optimum tensile properties are obtained by curing this rubber compound for 30 minutes at 143° C. Thus cured, the M70 compound shows the following mechanical characteristics:

| | |
|---|---|
| Shore A hardness | 72 |
| Modulus, 200%, kg./cm.$^2$ | 120 |
| Tensile strength, kg./cm.$^2$ | 165 |
| Ultimate elongation, per cent | 285 |

The rubber-to-metal bonded specimens, vulcanized under these conditions, are subjected to the static shear test, the stresses being increased until the rupture of about one half of the rubber parts occurs, the detachment of the rubber from the metal parts never taking place. Some of these specimens are tested at room temperature, others at 50° C. and at 100° C. respectively, after remaining for 10 minutes at the same temperatures; others are tested at room temperature after having been subjected to oven-aging periods of 7, 14 and 28 days at 56° C.

Hereafter are listed the detailed values of the so-obtained shear loads calculated for each specimen, together with the corresponding average values for each treatment:

| | | |
|---|---|---|
| At room temperature, kg./cm.$^2$ | 94—113—87—94—92 | average 96. |
| At 50° C., kg./cm.$^2$ | 74—65—74—72—74 | average 72. |
| At 100° C., kg./cm.$^2$ | 56—62—55—59—62 | average 59. |
| After 7 days at 56°, kg./cm.$^2$ | 115—107—110—104—108 | average 109. |
| After 14 days at 56°, kg./cm.$^2$ | 92—102—95—112—115 | average 103. |
| After 28 days at 56°, kg./cm.$^2$ | 104—115—113—111—106 | average 110. |

Since detachment of the rubber from the metal parts never occurs, the lower values of the specific loads in the test carried out at 50° C. and 100° C. depend on the smaller intrinsic resistance of the rubber part of the specimens at such temperatures. In fact, this decreased resistance is also observed in bonds resulting from other processes, for instance, from the brass-plating process, which gives similarly good results when rubber compounds of the same type, as the M70 compound, are employed.

The increase of the specific load observed in the specimens aged at 56° C., with respect to the unaged specimens, depends on the improvement in the mechanical characteristics of the rubber which is often observed in the starting steps of the artificial aging tests, and proves that the bond has remained unaltered, despite the prolonged standing of the specimens at 56° C. during the aging test.

Good results are also obtained by varying the resorcinol content in the adhesive solution, for instance, by decreasing it from 9% to 3%, or even to 1%, on the rubber weight; or by substituting the resorcinol with other phenolic substances, as for instance, the RZ product, in amounts of 5, 10 or 15% of the rubber, and hydroquinone in amounts from 3 to 12%; or also by employing the EF product as the sole aldehydimine, without the PF product, together with the mentioned phenolic compounds, or also with phenol in different amounts.

*Example 3.*—This example relates to an adhesive solution containing a mixed aldehydimine and illustrates the good results obtained by its employment in different tests.

Raw methylene-furfurylidene-hexamethylenediamine is prepared by reacting a gram-molecule of hexamethylenediamine with a gram-molecule of furfural, dissolving the product thus obtained in ethyl alcohol, adding to this solution a 38% aqueous solution of formaldehyde in a quantity corresponding to one gram-molecule, and then eliminating the solvent and drying the product on a water-bath in vacuum.

A brown oily liquid is obtained, which is then dissolved in benzene and added, in an amount corresponding to 25.2% of the rubber by weight, to a benzenic solution of the following rubber stock, so as to obtain a weight ratio of 1:12 between the total solids content and the solvent:

| | |
|---|---|
| Rubber (smoked sheets) | 100 |
| Zinc oxide | 5 |
| Mercaptobenzothiazole | 1 |
| Phenylbetanaphthylamine | 3 |

An hour after having applied by brush the adherence layer ERZ indicated in the 1st example, a thin film of the above adhesive solution is applied in the same way to the iron parts for the manufacture of 8 specimens of the first type and 12 specimens of the second type; the adhesive solution is allowed to dry and metal parts are then heat-treated at 140° for 2 hours in an oven in which air is circulating. The specimens of the first and second type are then obtained by assembling the treated iron parts either with the A50, or with the M70 rubber compound, and vulcanizing the assemblies as required by said rubber compounds. The specimens are then subjected to the following tests, thus obtaining the following indicated results:

*Rubber compound A50:*
Tensile test, kg./cm.$^2$ _____ 83—83—83
Dynamic test B (shear angle±52°)—
At 25°, thousands of cycles, 525—545—555, average _____ 540
At 100°, thousands of cycles, 465—450—315, average _____ 410

*Rubber compound M70:*
Tensile test, kg./cm.$^2$ _____ 71—83—83
Shear dynamic test A, cycles _____ 126,000—144,000
Shear dynamic test B (shear angle±40°)—
At 25° C., thousands of cycles, 750—495—865, average _____ 700
At 100° C., thousands of cycles, 320—365—365, average _____ 350

The rupture of the rubber part occurs in all tests.

*Example 4.*—The adhesive solution described in the foregoing examples always contains greater or smaller amounts of antioxidants. This example refers to the results obtained with an adhesive solution not containing antioxidant and having, as a sole adhesive agent, the EF product, whose prepartion has been described in Example 2.

A rubber stock of the following composition is prepared in a two-rolls mill:

Rubber (smoked sheets) _____ 100
Zinc oxide _____ 10
Mercaptobenzothiazole _____ 0.5
EF _____ 60

The adhesive solution, which will be indicated hereafter with the letters "GMEF," is then prepared by dissolving 10 parts by weight of this rubber stock in 135 parts by weight of refined benzene. In all cases the adherence-layer ERZ, described in the 1st example, is used. The rubber compounds M70 and A50, whose compositions have already been given, as well as the two following ones, are employed:

| Rubber compound | "E40" | "E65" |
|---|---|---|
| Rubber (Smoked sheets) | 100 | 100 |
| Zinc oxide | 10 | 10 |
| Benzothiazyldinitrophenylsulphide | 0.75 | 0.75 |
| Diphenylguanidine | 0.50 | 0.50 |
| Phenylbetanaphthylamine | 0.80 | 0.80 |
| Phenylalphanaphthylamine | 0.20 | 0.20 |
| Stearic acid | 0.50 | 0.50 |
| FF Black | | 60 |
| Sulphur | 3 | 3 |

The E40 and E65 rubber compounds give particularly poor results on brass-plated iron. The optimum curing times for them are respectively 20 and 30 minutes at 143° C. Vulcanized under these conditions, these two rubber compounds have the following mechanical characteristics:

| Rubber compound | E40 | E65 |
|---|---|---|
| Shore A hardness | 40 | 65 |
| Modulus 300%, kg./cm.$^2$ | 30 | 190 |
| Tensile strength, kg./cm.$^2$ | 200 | 240 |
| Ultimate elongation, percent | 590 | 375 |

The adherence-layer and, an hour later, the adhesive solution are applied, as a rule, in this example, by brushing lightly on the metal parts, so as to obtain thin films; the resinification always occurs about an hour after the second brushing and the vulcanization is carried out under the conditions already stated for each rubber compound.

The metal to which the bond has been effected, the quality of the rubber compound, and the resinification conditions, when differing from the standard (2 hours at 140° C.), as well as the temperature of the shear dynamic test B, are specified in every instance.

The specimens assembled with iron parts and with all four rubber compounds give, at tensile test, detachment loads equal to or higher than 83 kg./cm.$^2$. For comparison, the direct bond of the rubber compound M70 to brass-plated iron has been effected with the same specimens; thus giving an average detachment load of about 65 kg./cm.$^2$.

In a series of 25 shear dynamic tests A, effected on specimens having iron parts assembled to the rubber compound M70, and performed in different periods of time, durations corresponding to from 80,000 to 210,000 cycles, with an average of 142,000 cycles, were obtained. The rupture of the rubber, instead of its detachment, always occurred. By testing, under the same conditions, the specimens assembled with the E65 rubber compound, the following results have been obtained:

Thousands of cycles, 139—176—173—154, average 160

Specimens of the first type, prepared by directly assembling the rubber compound M70 to the brass-plated iron parts, have lasted for a period of time corresponding to about 100,000 cycles.

In a series of shear dynamic tests B, on specimens having iron parts assembled to the one or to the other of the four rubber compounds, wherein the heat-treatment in circulating air of the solutioned metal parts has been made, as hereafter indicated, for different periods of time at different temperatures, said tests being effected under the hardest conditions, that is at 100° C. and 120° C., the following results were obtained:

| Resinification time | Thousands of cycles | Cycles average |
|---|---|---|
| Rubber compound A50 (shear angle ±52°): | | Test temperature 100° C. |
| 2 hours at 140° | 146—160—133—191—171 | 160,000 |
| 1 hour at 150° | 220—280—270 | 257,000 |
| 20 mins. at 160° | 170—200—130 | 167,000 |
| 10 mins. at 170° | 120—310—140 | 190,000 |
| | | Test temperature 120° C. |
| 2 hours at 140° C | 92—85—77—92—83 | 86,000 |
| Rubber compound M70 (shear angle ±40°): | | Test temperature 100° C. |
| 2 hours at 140° | 263—590—530—417—431 | 446,000 |
| 1 hour at 150° | 480—520—580 | 527,000 |
| 20 mins. at 160° | 480—410—580 | 490,000 |
| 10 mins. at 170° | 570—440—580 | 533,000 |
| | | Test temperature 120° C. |
| 2 hours at 140° | 240—150—290—260—310 | 250,000 |
| Rubber compound E40 (shear angle ±52°): | | Test temperature 100° C. |
| 2 hours at 140° | 123—284—240—212—142 | 200,000 |
| Rubber compound E65 (shear angle ±40°): | | |
| 2 hours at 140° | 280—460—430—400—530 | 420,000 |

In the tests the rupture of the rubber, instead of its detachment, always occurs.

Specimens of the same type, prepared by directly assembling the rubber compound M70 to brass-plated iron parts and subjected to the same test at the temperature of 100° C., gave average life periods corresponding to about 200,000 cycles.

Specimens of the first type, having iron parts assembled to the E65 rubber compound, were subjected to an artificial aging test for 0—3—7—14—21 days in an oven at 78° C. At the end of the respective aging periods, the specimens were subjected either to static tensile tests, or to dynamic shear tests A, and the following results were observed:

| Specimens | Tensile test | Shear test A, cycles |
|---|---|---|
| unaged, kg./cm.$^2$ | 83—83—83 | 240,000—176,000—154,000 |
| aged 3 days at 78° C | 83—83 | 230,000—134,000 |
| aged 7 days at 78° C | 83—81 | 230,000—197,000 |
| aged 14 days at 78° C | 83—83 | 230,000—154,000 |
| aged 21 days at 78° C | 62—74 | 69,000—154,000 |

The rupture of the rubber, instead of its detachment, always occurred.

Specimens with iron parts have been subjected also to impact-tests. On the said metal parts were sprayed the adherence-layer EIRZ, described in the 1st example, diluted with an equal amount of ethyl alcohol by weight and successively the adhesive solution GMEF, diluted with an equal amount of benzene by weight. After a 2-hour treatment in an oven at 140° C., in which air was circulating, the solutioned metal parts were assembled respectively with the rubber compounds A50 and M70, and the thus-obtained assemblies were then vulcanized for 30 minutes at 143° C. In the following table the numbers of blows required to cause the rupture of the specimens, are shown:

| Rubber compound A50 | 10—14—11—11—9 | average 11. |
| Rubber compound M70 | 10—7—10—8—9 | average 9. |

In the specimens assembled with the A50 rubber compound, rupture occurred in the film formed from the adhesive solution, while in those assembled with the M70 rubber compound the rubber part was broken.

Comparison specimens, prepared by directly vulcanizing the rubber compound M70 on brass-plated iron parts, broke under the same conditions, after only one or two blows.

Static tensile tests and dynamic shear tests A were also performed on specimens prepared by paint-brushing the adherence-layer ERZ and the adhesive solution GMEF on previously sand-blasted parts of non-ferrous metals (or parts of iron clad with other metals, such as lead), by subjecting the said solutioned metal parts to a two-hour heat treatment at 140° C., assembling the so-treated and solutioned metal parts to the rubber compound M70, and vulcanizing the assemblies for 30 minutes at 143° C. The following results were obtained for each metal:

| Metal | Tensile test | Shear Test A, cycles |
| --- | --- | --- |
| Aluminium, kg./cm.$^2$ | 83—83 | 110,000 |
| Zinc, kg./cm.$^2$ | 83—83 | 102,000 |
| Lead (lead clad iron), kg./cm.$^2$ | 83—83 | 88,000 |
| Copper, kg./cm.$^2$ | 64—76 | 154,000 |
| Brass, kg./cm.$^2$ | 73—83 | 134,000 |
| Stainless steel 18/8, kg./cm.$^2$ | 64—76 | 50,000 |

The rupture of the rubber was noted for the highest values, the detachment occurring otherwise than in the film formed from the adhesive solution. Some satisfactory results have also been obtained on specimens provided with nickel-plated copper parts. When brass parts are involved, this process shows, in comparison with the direct bond, the advantages not being limited by the compositions of the rubber compound and of the brass, and yet obtaining safer and better results.

Similarly good results are obtained by employing, in the preparation of the adhesive solution, instead of the EF product, the di-furfurylidene-di-beta-aminoethyl sulphide, which is an aldehydimine derived from a linear aliphatic diamine including in its polymethylenic chain an heteroatom.

*Example 5.*—This example shows the results obtained when employing an adherence-layer containing, as a component having affinity for metals, 1.3-dimercaptobenzene, that is, a product not containing phenolic hydroxyles, but only two sulphydrilic groups in a benzenic nucleus. The adherence-layer is prepared by dissolving 10 parts of 1.3-dimercaptobenzene and 0.4 part of hydroquinone, as an antioxidant, in denatured 95° ethyl alcohol, by adding 4 parts of hexamethylenetetramine as an aqueous 40% solution, and adding ethyl alcohol, so as to reduce the total solids content to 20% by weight. This adherence-layer is brushed on the metal parts of specimens of the first type, made of, or plated or clad with, the metals hereafter indicated. Just after the first layer is air-dried, the adhesive solution GMEF, as described in the Example 4, but diluted in an equal part by weight of benzene, is sprayed. The adhesive solution being also air-dried, the metal parts are submitted to a two-hour heat-treatment at 140° C., in an oven in which air is circulating. The specimens are obtained by assembling the said solutioned and heat-treated metal parts with the rubber compound M70 and by vulcanizing the thus-obtained assemblies for 30 minutes at 143° C. Said specimens, when submitted either to the tensile tests, or to the dynamic shear test A, gave the following results:

| Metal | Tensile test | Shear test A, cycles |
| --- | --- | --- |
| Iron, kg./cm.$^2$ | 60—56 | 38,000. |
| Aluminium, kg./cm.$^2$ | 37—37 | 91,000. |
| Zinc, kg./cm.$^2$ | 58—61 | 72,000. |
| Copper, kg./cm.$^2$ | 54—55 | 38,000. |
| Nickel (nickel plated copper), kg./cm.$^2$ | 71—57 | 86,000. |
| Brass, kg./cm.$^2$ | 83—83 | 115,000. |
| Tin (tinned iron), kg./cm.$^2$ | 49—47 | Not tested. |
| Lead (lead-clad iron), kg./cm.$^2$ | 71—72 | Do. |
| Chrome (chrome-plated copper), kg./cm.$^2$ | 35—34 | Do. |
| Stainless steel 18/8, kg./cm.$^2$ | 40—43 | Do. |

The rupture of the rubber was observed only in the specimens provided with iron, brass and lead-clad iron parts. The tearing of the film formed from the adhesive solution occurred with the aluminium, zinc, copper or tinned parts. The detachment from the metal on relatively extensive areas, occurred in the specimens assembled with nickel plated copper, chrome-plated copper or stainless steel parts.

*Example 6.*—This example shows the results obtained when employing adherence-layers containing, as components having affinity for metals, two reaction products of resorcinol with thionyl chloride, prepared in the presence of anhydrous aluminium chloride.

By reacting resorcinol with thionyl chloride (molecular ratio 1:2) dissolved in a mixture of dehydrated ethyl ether and carbon disulphide, in the presence of a small quantity of dehydrated aluminium chloride, and eliminating from the raw reaction product the solvents and the aluminium compounds, a refined product is obtained, consisting of diresorcinol sulphoxides, with small amounts of the products hereafter described.

By reacting resorcinol, thionyl chloride and dehydrated aluminium chloride in the same solvents, the molecular ratio being 3:2:2, and refining the raw product, a substance is obtained, which has the behaviour and composition of a resorcinol-sulphonium chloride.

Two adherence-layers, which shall be named "Resorcinol sulphoxide-Hexa" and "Resorcinol sulphonium chloride-Hexa" were prepared by dissolving the one or the other of the two aforesaid resorcinol derivatives in ethyl alcohol, and mixing the solution with a 40% aqueous solution of hexamethylenetetramine, the solids ratio being of 5:1 by weight in both cases, and diluting with ethyl alcohol, so as to have a total solids content of 17%.

Specimens of the first type were prepared with these adherence-layers, employing the GMEF adhesive solution and the M70 rubber compound, and metal parts made of, or plated, or clad with, different metals, according to the method indicated in the Example 5. Said specimens, when submitted either to the tensile test, or to the dynamic shear test A, gave the following results:

*Adherence-layer "Resorcinol sulphoxide-Hexa"*

| Metal | Tensile test | Shear test A, cycles |
| --- | --- | --- |
| Iron, kg./cm.$^2$ | 83—83 | 134,000. |
| Aluminium, kg./cm.$^2$ | 77—83 | 134,000. |
| Zinc, kg./cm.$^2$ | 83—83 | 99,000. |
| Lead (lead,clad iron), kg./cm.$^2$ | 65—53 | 67,000. |
| Copper, kg./cm.$^2$ | 67—70 | 115,000. |
| Nickel (nickel-plated copper), kg./cm.$^2$ | 59—53 | 45,000. |
| Brass, kg./cm.$^2$ | 83—80 | 96,000. |
| Stainless steel 18/8, kg./cm.$^2$ | 83—83 | 62,000. |
| Tin (tinned iron), kg./cm.$^2$ | 65—83 | Not tested. |
| Chrome (chrome-plated copper), kg./cm.$^2$ | 29—35 | Do. |

The rupture of the rubber, or the tearing of the film formed from the adhesive solution were observed in the specimens provided with iron, copper, brass, or stainless steel parts. With the other metal parts, some more or less extensive detachments were observed near the metal.

*Adherence-layer "Resorcinol sulphonium chloride-Hexa"*

| Metal | Tensile test | Shear test A, cycles |
|---|---|---|
| Iron, kg./cm.² | 83—83 | 154,000. |
| Aluminium, kg./cm.² | 83—83 | 115,000. |
| Zinc, kg./cm.² | 83—83 | 115,000. |
| Copper, kg./cm.² | 82—75 | 115,000. |
| Brass, kg./cm.² | 83—83 | 125,000. |
| Stainless steel 18/8, kg./cm.² | 83—76 | Not tested. |

In all these tests, the rupture of the rubber occurred.

*Example 7.*—This example shows the results obtained when employing adherence-layers containing, as components having affinity for metals, the hereafter indicated phenolic substances. Said adherence-layers were prepared by mixing an alcoholic, or alcoholic-acetonic, solution of the phenolic substance, according to its solubility, with a 40% aqueous solution of hexamethylenetetramine, so as to obtain the solids ratio by weight for every substance indicated, and a total solids content ranging from 6 to 20%. According to its concentration, the adherence-layer is applied by spraying or by brushing on iron parts. Some adherence-layers were applied also to aluminium parts. The adhesive solution GMEF and the rubber compound M70 were successively applied, according to the method indicated in the Example 5.

The specimens provided with iron parts gave the following results:

| Phenolic substance | solids ratio | tensile test, kg./cm.² | shear test A, cycles |
|---|---|---|---|
| resorcinol | 5:2 | 74—58 | 101,000. |
| 2-methylresorcinol | 5:2 | 53—47 | 86,000. |
| 4-chlororesorcinol | 5:2 | 83—83 | 77,000. |
| cathecol | 5:2 | 47—53 | 43,000. |
| phloroglucinol | 5:2 | 49—39 | 67,000. |
| p-bromophenol | 3:1 | 63—63 | 154,000. |
| p-nitrophenol | 5:2 | 73—73 | 144,000. |
| p-aminophenol | 5:2 | 67—67 | 58,000. |
| p-hydroxydiphenylamine | 4:1 | 72—65 | 64,000. |
| 2,5-dibromohydroquinone | 5:1 | 66—57 | 54,000. |
| p,p'-dihydroxydiphenylsulphone | 5:2 | 43—40 | 74,000. |
| hydroquinone | 5:2 | 33—33 | Not tested. |
| m-aminophenol | 5:2 | 33—47 | Do. |

Specimens provided also with iron parts and made identifically, but employing adherence-layers prepared by using, instead of a single phenolic substance, a mixture of phenol with resorcinol, or with the RZ product, in equal parts by weight, the ratio of the total of both phenolic components, with hexamethylenetetramine being always of 5:2, gave in the tensile tests, detachment loads of 59–53 and 76–70 kg./cm.² respectively.

The specimens provided with aluminium parts gave the following results:

| Phenolic substance | solids ratio | tensile test, kg./cm.² | shear test A, cycles |
|---|---|---|---|
| resorcinol | 5:2 | 70—72 | 102,000 |
| 4-chlororesorcinol | 5:2 | 43—53 | 58,000 |
| phloroglucinol | 5:2 | 40—42 | 58,000 |
| p,p'-dihydroxydiphenylsulphone | 5:2 | 39—37 | 45,000 |

*Example 8.*—This example shows the results obtained when employing an adhesive solution containing, besides the natural rubber, a rather high amount of reclaimed rubber. A rubber stock of the following composition was used:

| | |
|---|---|
| Rubber (smoked sheets) | 100 |
| Tire tread reclaim | 200 |
| Zinc oxide | 40 |
| Mercaptobenzothiazole | 0.5 |

The reclaimed rubber indicated above is of the type obtained by heat-softening tire tread scraps mixed with 10% coal tar oil. To the above rubber stock dissolved in benzene, the product EF, also dissolved in benzene, is added, in an amount of 180% of the rubber by weight (equivalent to 60% on the total content of rubber and reclaimed rubber). The total weight of benzene is adjusted so as to obtain a ratio of 1:15 by weight between the total solids content and the solvent. The adherence-layer ERZ and the adhesive solution, as above indicated, are brushed at a convenient time interval on the iron parts of the specimens of the first type and, after evaporating the solvent, the solutioned iron parts are subjected to a two-hour heat-treatment at 140° C. The rubber compounds A50 and M70 are respectively assembled with the solutioned and heat-treated metal parts, and the specimens thus obtained are vulcanized for 30 minutes at 143° C. The following results were obtained with these specimens in the test hereafter indicated:

Rubber compound A50, tensile test, kg./cm.² ____ 67—53
Rubber compound M70, tensile test, kg./cm.² ____ 83—83
   Shear test A, cycles _____ 115,000–120,000

The tearing of the film formed from the adhesive solution occurred in the specimens assembled with the rubber compound A50, and the rupture of the rubber in those assembled with the M70 rubber compound.

*Example 9.*—This example shows the results obtained when using a compound based on a rubbery butadiene-acrylonitrile copolymer. A compound of the following composition was employed:

| | |
|---|---|
| Polysar NP 350* | 100 |
| Zinc oxide | 20 |
| Benzothiazylcyclohexysulphenamide | 1.2 |
| Phenyl-beta-naphthylamine | 1.5 |
| Stearic acid | 2 |
| Cumar resin | 10 |
| Tricresylphosphate | 20 |
| (Semi-reinforcing furnace) black | 2 |

*Indicates a synthetic rubber consisting of a butadiene-acrylonitrile copolymer (containing about 38 percent combined acrylonitrile) manufactured by Copolymer Corporation, Sarnia, Canada.

Optimum tensile properties were obtained by curing this compound for 30 minutes at 143° C. Thus cured, it showed the following mechanical characteristics:

| | |
|---|---|
| Shore A hardness | 58 |
| Modulus, 300%, kg./cm.² | 100 |
| Tensile strength, kg./cm.² | 130 |
| Ultimate elongation, per cent | 400 |

To prepare the adhesive solution, a rubber stock having the following composition was employed:

| | |
|---|---|
| Polysar NP 350* | 100 |
| Zinc oxide | 5 |
| Mercaptobenzothiazole | 1 |
| Peptizing agent | 1 |
| (Semi-reinforcing furnace) black | 40 |

*Indicates a synthetic rubber consisting of a butadiene-acrylonitrile copolymer (containing about 38 percent combined acrylonitrile) manufactured by Copolymer Corporation, Sarnia, Canada.

The peptizing agent here employed was a mixture of equal parts of trichlorothiophenol and paraffin wax.

In order to prepare the adhesive solution, the last described rubber stock was dissolved in benzene, and to the thus-obtained solution, the EF product, also dissolved in benzene, was added in an amount corresponding to 60% by weight on the rubber. The amount of benzene was adjusted so as to obtain a ratio of 1:13 by weight between the total solids content and the solvent.

The adherence-layer ERZ and the above adhesive solution were applied to the iron parts of the specimens of the first type, heat-treated, assembled with the rubber compound above described, and the assemblies vulcanized, as indicated in the preceding example, temperatures and times of the heat-treatments being as shown therein. With these specimens, the following results were obtained:

Tensile test, kg./cm.$^2$ _____ 83—83
Shear test A, cycles _____ 88,000

In every case the rupture of the rubber part occurred.

*Example 10.*—This example shows the results obtained when using a compound based on a rubbery chlorobutadiene polymer. A compound of the following composition was employed:

| | |
|---|---|
| Neoprene GN–A | 100 |
| Light magnesium oxide | 4 |
| Phenyl-beta-napthylamine | 1.2 |
| Phenyl-alpha-naphthylamine | 0.3 |
| Paraffin wax | 1 |
| Mineral oil | 5 |
| Anthracene black | 40 |
| Carbon black | 40 |
| Calcium carbonate | 15 |
| Zinc oxide | 5 |

Optimum tensile properties were obtained by curing this compound 30′ at 143° C. Thus cured, it showed the following mechanical characteristics:

| | |
|---|---|
| Shore A hardness | 70 |
| Modulus, 200%, kg./cm.$^2$ | 140 |
| Tensile strength | 150 |
| Ultimate elongation, per cent | 210 |

The adhesive solution was prepared by dissolving some neoprene GN–A in benzene, adding to this solution the EF product, also dissolved in benzene, in an amount of 60% by weight on the rubber and diluting the solution with the same solvent, so as to have a total ratio of 1:15 by weight between the total solids content and the solvent. The adherence-layer ERZ and the said solution were brushed, at a convenient time interval, on the iron parts of the specimens of the first type, heat-treated, assembled with the rubber compound above described, and the assemblies vulcanized, as indicated in the preceding example, temperatures and times of the heat-treatments being as therein.

With these specimens the following results were obtained:

Tensile test, kg./cm.$^2$ _____ 67—58—67
Shear test A, cycles _____ 96,000

The detachment always occurred in the film formed from the adhesive solution, with partial rupture of the rubber.

*Example 11.*—This example shows the results obtained when employing a compound based on an ethylene tetrasulphide polymer. A compound having the following composition was employed:

| | |
|---|---|
| Thiokol A | 100 |
| Rubber (smoked sheets) | 7 |
| Zinc oxide | 10 |
| Tetramethylthiouram disulphide | 0.15 |
| Diphenylguanidine | 0.30 |
| Stearic acid | 5 |
| Carbon black | 25 |

Optimum tensile properties were obtained by curing this compound 20′ at 143° C. Thus cured, it showed the following mechanical characteristics:

| | |
|---|---|
| Shore A hardness | 75 |
| Tensile strength, kg./cm.$^2$ | 50 |
| Ultimate elongation, per cent | 300 |

Five specimens of the first type were prepared by assembling the above rubber compound with iron parts previously treated with the adherence-layer ERZ and successively with the adhesive solution GMEF, and submitted to a two hour treatment at 140° C. in oven in which air is circulating. The specimens, vulcanized 20′ at 143° C., were then cooled under pressure by circulating water in the press. These specimens showed the following results:

Tension test, kg./cm.$^2$ _____ 40—33—28—27
Shear test A, cycles _____ 6400

In all cases the rupture of the compound occurred near the film formed from the adhesive solution.

While we have shown and described the preferred embodiments of our invention, we do not limit ourselves to the details of processes or constructions disclosed by way of illustration, as these may be changed and modified by those skilled in the art without departing from the spirit of our invention or exceeding the scope of the appended claims.

We claim:

1. A process for bonding metal and metal alloys to a vulcanizable rubber compound characterized by successively applying to clean bonding surfaces of said metal parts an adherence layer and an adhesive solution, heat treating at a temperature of from 100° C. to 180° C. the so treated metal parts in the presence of air, applying the said rubber compound to the so treated surfaces of said metal parts, and subjecting said assembled metal and rubber components to a vulcanizing heat treatment at a temperature of from 110° C. to 170° C.; said adherence layer containing no rubber and only substances of low molecular weight, of which at least one has affinity for metals; said adhesive solution containing at least one rubber, capable of bonding by vulcanization with said rubber compound, and at least one nitrogenous substance capable of reacting with said substances having affinity for metals, to form an insoluble, non-melting and metal-adhering resin, during said first heat treatment; said nitrogenous substances being N-substituted aldehydimines having a plurality of azomethinic groups corresponding to the general formula R(—N=CH—R′)$_n$, where $n$ is an integer higher than 1, R is an organic radical of $n$ valency, and R′ represents a radical consisting of one atom of hydrogen and a monovalent organic radical.

2. A process according to claim 1, wherein one of said N-substituted aldehydimines is monomeric difurfurylidenehexamethylenediamine.

3. A process according to claim 1, wherein said N-substituted aldehydimines are monomeric and are selected from the class consisting of difurfurylidene-hexamethylenediamine, N-methylene-N′-furfurylidene-hexamethylenediamine, difurfurylidene-p-phenylenediamine, and difurfurylidene-di-beta-aminoethyl sulphide.

References Cited in the file of this patent

UNITED STATES PATENTS

| | | |
|---|---|---|
| 1,636,596 | Ellis | July 19, 1927 |
| 1,883,415 | Seebach | Oct. 18, 1932 |
| 2,386,112 | Harkins | Oct. 2, 1945 |
| 2,459,742 | Bradley et al. | Jan. 18, 1949 |
| 2,471,905 | Smith | May 31, 1949 |
| 2,502,406 | Entwistle | Mar. 28, 1950 |